(No Model.)
M. G. PETTEY.
CHEESE KNIFE.
No. 266,513.  Patented Oct. 24, 1882.
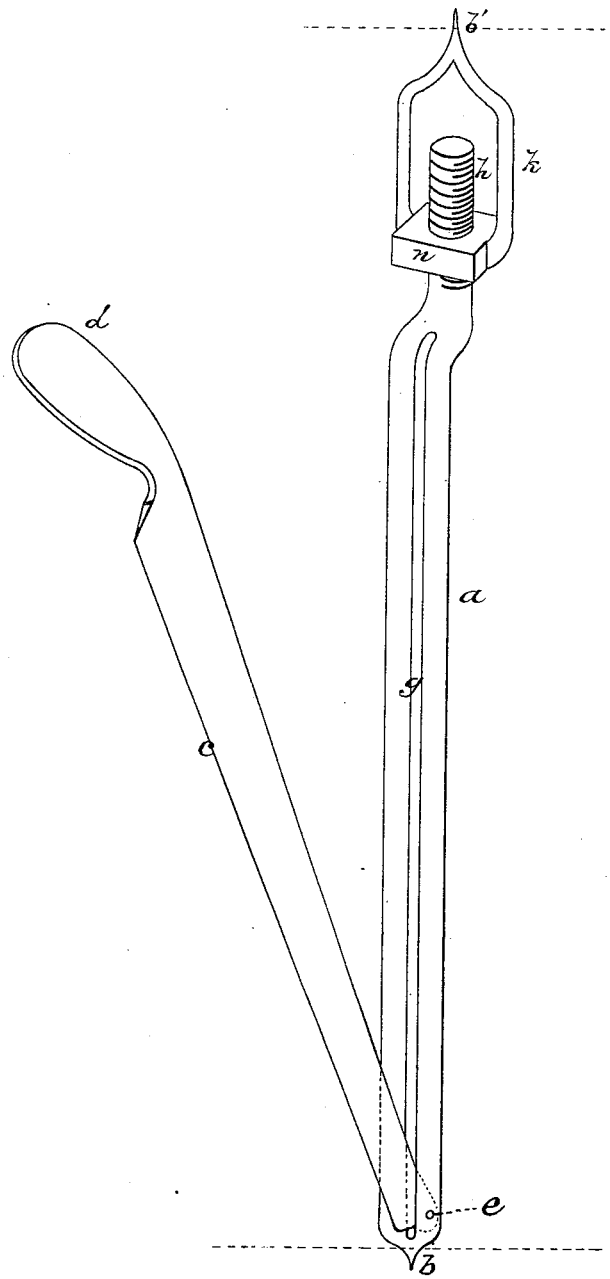
WITNESSES
E. H. Bates
James J. Sheehy.
INVENTOR
Martin G. Pettey,
by Anderson & Smith
his ATTORNEYS

UNITED STATES PATENT OFFICE.

MARTIN G. PETTEY, OF SEARCY, ARKANSAS.

CHEESE-KNIFE.

SPECIFICATION forming part of Letters Patent No. 266,513, dated October 24, 1882.

Application filed March 11, 1882. (No model.)

*To all whom it may concern:*

Be it known that I, MARTIN G. PETTEY, a citizen of the United States, and a resident of Searcy, in the county of White and State of Arkansas, have invented a new and valuable Improvement in Cheese-Knives; and I do hereby declare that the following is a full, clear, and exact description of the construction and operation of the same, reference being had to the annexed drawing, making a part of this specification, and to the letters and figures of reference marked thereon.

The figure of the drawing is a representation of a perspective view of my improved cheese-knife.

This invention has relation to knives for cutting cheese; and it consists in the construction and novel arrangement of the pointed center stem, and the blade pivoted to the lower end thereof; also, of the receiving slot or seat in the center stem, and the pointed bracket-nut engaging the threaded end of the stem, all as hereinafter set forth.

In the accompanying drawing, the letter $a$ designates a pointed center stem or handle, which is of sufficient length to be easily inserted through the center of the cheese, so that its point $b$ shall pierce the board or floor of the cheese-safe on which the cheese rests.

$c$ indicates the knife-blade, which is provided at its free end with a handle portion, $d$, and is at its other end pivoted to the lower end of the center steam, $a$, near its point, as at $e$. The blade is long and narrow, and is designed, when closed against the stem $a$, to fit it neatly, so that both blade and stem can be inserted together through the center of the cheese. The blade being then moved outward radially from the stem, which is held upright, serves to cut the cheese in a true and neat manner.

In order to protect the blade, the handle is designed to be made with a slot or seat, $g$, extending upward from the pivot $e$, into which the blade is shut. Above the slot the stem is threaded, as at $h$, to receive a bracket-nut, $n$, the bracket or loop portion $k$ of which extends upward and is pointed at $b'$, so that when the nut is turned upward the point $b'$ will enter the top of the cheese-safe. In this manner the stem $a$ is held securely in a central upright position, and is, however, free to turn on the end pivots, $b$ and $b'$, as the knife is worked around the cheese in making the radial cuts.

A slotted bar journaled in a cheese-box by driving it up through a perforation in the bottom of the box and through the center of the cheese has been combined with a knife having two cutting-edges pivoted in the slot in the bar above the cheese, so that the knife may be brought down to cut the cheese radially, and this construction is not claimed herein.

Having described this invention, what I claim, and desire to secure by Letters Patent, is—

1. In a cheese-knife, the pointed center stem, $a\ b$, provided with the seat-slot $g$, in combination with the knife $c$, having the handle $d$ pivoted by one end in the lower end of the seat-slot $g$, whereby the knife is adapted to be inserted centrally and vertically through the cheese from the top thereof, substantially as specified.

2. A cheese-knife consisting of the centering-stem $a$, having the blade slot or seat $g$, threaded end $h$, and pointed bracket-nut $n$, and the knife $c$, pivoted to the lower end of the stem, and having the handle portion $d$ at its outer or free end, substantially as specified In testimony that I claim the above I have hereunto subscribed my name in the presence of two witnesses.

MARTIN G. PETTEY.

Attest:
J. W. HOUSE,
J. C. MCCAULEY.